United States Patent
Ichikawa et al.

(10) Patent No.: US 8,540,173 B2
(45) Date of Patent: Sep. 24, 2013

(54) PRODUCTION OF FINE PARTICLES OF FUNCTIONAL CERAMIC BY USING PULSED LASER

(75) Inventors: Yuki Ichikawa, Ann Arbor, MI (US); Zhengong Hu, Ann Arbor, MI (US); Bing Liu, Ann Arbor, MI (US); Yong Che, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 277 days.

(21) Appl. No.: 12/951,557

(22) Filed: Nov. 22, 2010

(65) Prior Publication Data

US 2011/0193025 A1   Aug. 11, 2011

Related U.S. Application Data

(60) Provisional application No. 61/302,978, filed on Feb. 10, 2010.

(51) Int. Cl.
*B02C 19/18* (2006.01)
(52) U.S. Cl.
USPC ................................. 241/1; 241/21
(58) Field of Classification Search
USPC .................................. 241/1, 21, 301
See application file for complete search history.

(56) References Cited

U.S. PATENT DOCUMENTS

| | | |
|---|---|---|
| 4,059,759 A | 11/1977 | Harney et al. |
| 5,539,764 A | 7/1996 | Shields et al. |
| 5,656,186 A | 8/1997 | Mourou et al. |
| 5,660,746 A | 8/1997 | Witanachchi et al. |
| 5,720,894 A | 2/1998 | Neev et al. |
| 5,742,634 A | 4/1998 | Rieger et al. |
| 5,756,924 A | 5/1998 | Early |
| 5,790,574 A | 8/1998 | Rieger et al. |
| 5,818,630 A | 10/1998 | Fermann et al. |
| 5,880,877 A | 3/1999 | Fermann et al. |
| 6,060,128 A | 5/2000 | Kim et al. |
| 6,156,030 A | 12/2000 | Neev |
| 6,312,768 B1 | 11/2001 | Rode et al. |
| 6,324,195 B1 | 11/2001 | Suzuki et al. |
| 6,574,250 B2 | 6/2003 | Sun et al. |
| 6,664,498 B2 | 12/2003 | Forsman et al. |
| 6,727,458 B2 | 4/2004 | Smart |

(Continued)

FOREIGN PATENT DOCUMENTS

| | | |
|---|---|---|
| JP | 3690968 B2 | 3/2001 |
| JP | 200957568 A | 3/2009 |

(Continued)

OTHER PUBLICATIONS

K. Bando et al, "Development of High-bright and Pure-White LED Lamps", Journal of Light & Visual Environment vol. 22, 2, 1998.

(Continued)

*Primary Examiner* — Mark Rosenbaum
(74) *Attorney, Agent, or Firm* — Dickinson Wright PLLC

(57) ABSTRACT

A method of forming nanometer sized fine particles of functional ceramic from a bulk functional ceramic, particularly fine particles of phosphorous ceramics from a bulk phosphor material is disclosed. The method relies on irradiation of a bulk phosphorous ceramic in a liquid with an ultrashort-pulsed-laser-fragmentation beam to thereby form nanometer sized particles of the phosphorous ceramic. The method is unique in that the generated particles retain the chemical and crystalline properties of the bulk phosphorous ceramic. The generated solutions are stable colloids from which the particles can be isolated or used as is.

8 Claims, 5 Drawing Sheets

(56) References Cited

U.S. PATENT DOCUMENTS

| | | |
|---|---|---|
| 6,783,569 B2 | 8/2004 | Cheon et al. |
| 7,113,327 B2 | 9/2006 | Gu et al. |
| 7,330,301 B2 | 2/2008 | Harter |
| 2001/0009250 A1 | 7/2001 | Herman et al. |
| 2002/0167581 A1 | 11/2002 | Cordingley et al. |
| 2003/0151053 A1 | 8/2003 | Sun et al. |
| 2004/0134896 A1 | 7/2004 | Gu et al. |
| 2005/0041976 A1 | 2/2005 | Sun et al. |
| 2005/0167405 A1 | 8/2005 | Stoltz et al. |
| 2005/0226287 A1 | 10/2005 | Shah et al. |
| 2005/0243396 A1 | 11/2005 | Fujii et al. |
| 2005/0276931 A1 | 12/2005 | Che et al. |
| 2006/0086834 A1 | 4/2006 | Pfeffer et al. |
| 2007/0029185 A1 | 2/2007 | Tung |
| 2007/0051202 A1 | 3/2007 | Raghuraman et al. |
| 2008/0006524 A1 | 1/2008 | Liu et al. |
| 2008/0175982 A1 | 7/2008 | Robinson et al. |
| 2009/0053523 A1 | 2/2009 | Kawasaki et al. |
| 2009/0075082 A1 | 3/2009 | Kim et al. |
| 2009/0142245 A1 | 6/2009 | Kwon et al. |
| 2009/0246413 A1 | 10/2009 | Murakami et al. |
| 2009/0246530 A1 | 10/2009 | Murakami et al. |
| 2009/0311513 A1 | 12/2009 | Hu et al. |
| 2010/0196192 A1 | 8/2010 | Liu et al. |
| 2011/0192450 A1 | 8/2011 | Liu et al. |
| 2011/0192714 A1 | 8/2011 | Liu et al. |
| 2011/0193025 A1 | 8/2011 | Ichikawa et al. |
| 2011/0196044 A1 | 8/2011 | Hu et al. |
| 2012/0282134 A1 | 11/2012 | Liu et al. |

FOREIGN PATENT DOCUMENTS

| | | |
|---|---|---|
| WO | 2004101711 A1 | 11/2004 |
| WO | 2006006582 A1 | 1/2006 |
| WO | 2006011317 | 2/2006 |
| WO | 2006030605 A1 | 3/2006 |
| WO | 2009117451 A1 | 3/2009 |

OTHER PUBLICATIONS

D. Dosev et al., "Photoluminescence of Eu3+:Y2O3 as an indication of crystal structure and particle size in nanoparticles synthesized by flame spray pyrolysis", Aerosol Science vol. 37, 402, 2006.

D. Jia, "Nanophosphors for White Light LEDs", Chem. Eng. Comm. vol. 194, 1666, 2007.

A. Konrad et al.,"Chemical vapor synthesis and luminescence properties of nanocrystalline cubic Y2O3: Eu", J. Appl. Phys. vol. 86, 3129, 1999.

G. Ledoux et al., "Facile and rapid synthesis of highly luminescent nanoparticles via pulsed laser ablation in liquid", Nanotechnology, vol. 20, 445605 (2009).

X. Li et al., "Solvothermal synthesis and luminescent properties of YAG: Tb nano-sized phosphor", Journal of Physics and Chemistry of Solids. vol. 66, 201, 2005.

B. Liu et al., "Nanoparticle generation in ultrafast pulsed laser ablation of nickel", Applied Physics Letters, vol. 90, 044103 (2007).

B. Liu et al., "Ultrafast sources: ultrafast lasers produce nanoparticles", Laser Focus World, vol. 43, 74 (2007).

M. Murakami et al., "Burst-Mode Femtosecond Pulsed Laser Deposition for Control of Thin Film Morphology and Material Ablation", Applied Physics Express, vol. 2, 042501 (2009).

S. Nishiura et al., "Preparation and Optical Properties of Transparent Ce:YAG Ceramics for High Power White LED", 2009 IOP Conf. Series: Materials Science and Engineering vol. 1, 012031, 2009.

H. Zhu et al., "High-Brightness LaPO4: Ce3+, Tb3+ Nanophosphor: Reductive Hydrothermal Synthesis and Photoluminescent Properties", J. Am. Ceram. Soc. vol. 91, 1682, 2008.

S. Besner et al., "Two-step femtosecond laser ablation-based method for the synthesis of stable and ultra-pure gold nanoparticles in water," Applied Physics A vol. 88, pp. 269-272, 2007.

J. Bovatsek et al., "Laser Ablation Threshold and Etch Rate Comparison between the Ultrafast Yb fiber-based FCPA Laser and a Ti:Sapphire Laser for Various Materials," Proceedings of SPIE, vol. 5662, pp. 661-666, 2004.

Bulgakova et al., "Pulsed laser ablation of solids transition from normal vaporization to phase explosion", APA, vol. 73, pp. 1990208, 2001.

Li-Chyong Chen "Particles Generated by PLD" Chapter 6 of Pulsed Laser Deposition of Thin Films, John Wiley & Sons Inc., 1994, pp. 167-196.

F. Mafuné et al., "Formation of Stable Platinum Nanoparticles by Laser Ablation in Water", Journal of Physical Chemistry B, vol. 107 (18), pp. 4218-4223, 2003.

Barcikowski et al., "Generation of nanoparticles colloids by picosecond and femtosecond laser ablation in liquid flow", Applied Physics Letters, vol. 91 (2007) 083113.

Barcikowski et al., "Properties of Nanoparticles Generated During Femtosecond Laser Machining in Air and Water", Applied Physics A, vol. 87 (2007).

J. Brannon et al., "Laser Processing for Microengineering Applications", Chp 5 in Microengineering Aerospace Systems, editor: H. Helvajian, copyright 1999, pp. 145, 160-162, 187 and 188.

M. Burst et al., "Synthesis of Thiol-Derivatized Gold Nanoparticles in a 2-phase liquid-liquid system", Journal Chemical Society, Chemical Communications, Issue 7, 801, 1994.

T. Donnelly et al., "Double pulse ultrafast laser ablation of Nickel in vacuum", Journal of Applied Physics 106, 013304, 2009.

S. Eliezer et al., "Synthesis of nanoparticles with femtosecond laser pulses", Physical Review B, vol. 69, 144119, 2004.

E. G. Gamaly et al., "Ultrafast ablation with high pulse rate lasers, Part I: Theoretical considerations", Journal of Applied Physics, vol. 85, 4213, 1999.

E. G. Gamaly et al., "Ultrafast ablation with high pulse rate lasers, Part II: Experiments on laser deposition of amorphous carbon films", Journal of Applied Physics, vol. 85, 4222, 1999.

I. Lee et al., "Production of Au-Ag alloy nanoparticles by laser ablation of bulk alloys", Chemical Communications, 2001, pp. 1782-1783.

B. Luther-Davies et al., "Picosecond high repetition rate pulsed laser ablation of dielectric: the effect of energy accumulation between pulses", Optical Engineering, vol. 44, 055102, 2005.

F. Mafuné et al., "Formation of gold nanoparticles by laser ablation in aqueous solution of surfactant".J. Physical Chem B, 105, 5114-5120 May 2001.

Nature Photonics Research Highlights, "Burst-mode benefits" technology review of M. Murakami et al., "Burst-Mode Femtosecond Pulsed Laser Deposition for Control of Thin Film Morphology and Material Ablation", Applied Physics Express 2 (2009) 042501. This review is found in Nature Photonics, vol. 3, May 2009 p. 261.

W. E. Nichols et al., "Laser Ablation of a platinum target in water. I. Ablations mechanisms", J. of Applied Physics vol. 100, 2006, 114911.

A. Pyatenko et al., "Synthesis of silver nanoparticles by laser ablation in pure water", Applied Physics A, vol. 79, 2004, pp. 803-806.

A. Reilly et al., "Pulsed laser deposition with a high average power free electron laser: Benefits of subpicosecond pulses with high repletion rate", Journal of Applied Physics, vol. 93, 3098, 2003.

J. Turkevich et al., "A study of the nucleation and growth processes in the synthesis of colloidal gold", Discussions of the Faraday Society, Issue 11, 55, 1951.

V. Iannotti et al., "Ultrafast pulsed laser deposition as a method for the synthesis of innovative magnetic films", Applied Surface Science 255, (2009) 5224-5227.

T. E. Itina et al., "Mechanisms of nanoparticle formation by short laser pulses", Proceedings of SPIE, vol. 6458, 64581U-1, (2007).

Yang, Li, Chapter 2, "Liquid-Phase Pulsed Laser Ablation" in Self-assemble and Ordering Nanomaterials by Liquid-Phased Pulsed Laser Ablation, Dissertation, Nov. 2007 pp. 33-51.

D. F. Huessy at al., "Water, Ultrapure" in Ullmann's Ency. Of Industrial Chemistry, Pub. Oct. 15, 2008, 26 pgs.

A.V. Simaken et al., "Nanodisks of Au and Ag produced by laser ablation in liquid environment", Chemical Physics Letters vol. 348, 2001, pp. 182-186.

PRODUCTION OF FINE PARTICLES OF FUNCTIONAL CERAMIC BY USING PULSED LASER

RELATED APPLICATIONS

This application claims the benefit of U.S. provisional application Ser. No. 61/302,978 filed Feb. 10, 2010.

STATEMENT REGARDING FEDERALLY SPONSORED RESEARCH

NONE

TECHNICAL FIELD

This invention is related to the application of formation of functional multi-element-compound particles, and more particularly, to use of ultrashort-pulsed-laser-fragmentation ablation to directly generate fine particles of a phosphorous ceramic from a bulk phosphorous ceramic.

BACKGROUND OF THE INVENTION

A variety of industrial and research fields require a novel method for generating fine particles of functional multi-element-ceramics which have the same functionality as the bulk material they are derived from. These materials include phosphorous ceramics, light-absorbing ceramics including sunlight absorbing materials in solar cells, and ceramic ionic conductors which can be used in a fuel cell.

Generally, to generate fine particles there are two approaches. First, is a synthetic approach like a chemical wet process where the generation starts with starting materials whose chemical identity is different from that of the final synthesized product. Second, is a process wherein the starting material is ground down to fine particle sizes such as in a mechanical milling process. This process can damage the chemical properties and crystalline structure of the starting material.

Luminescence is defined as a phenomenon in which a material absorbs external energy and then to emits light, preferably visible light. In a broad sense, a material exhibiting this phenomenon is called a "phosphor". Currently, phosphors are being used in many devices. This list includes but is not limited to: field emission devices, plasma display panels, cathode ray tubes (CRTs), light emission diodes (LEDs), vacuum florescent displays (VFDs), electro luminescence displays (ELDs), RGB screens, radiographic imaging, nuclear spectroscopy, crystal scintillators, and biotags.

In many industries, such as the LED industry, there is a need for small-sized phosphor particles, also called fine phosphors. One of the main reasons is to make it easy to handle them in printing, painting, coating, molding or spraying applications and to lower production costs of phosphor material since some phosphors contain expensive rare-earth materials. Small phosphor particles are advantageous for making a packed thin layer of phosphor coating with a minimum volume. Also, it is expected that higher emission efficiency, which is the ratio of emitted optical photons to absorbed energy, will be achieved by particle downsizing. It is known that reduction of the phosphor size to the nanometer scale of 1 to 100 nanometers, i.e., nanophosphor, alters its properties. Nanophosphors, in general, have very good emission efficiency.

There are several methods of making fine phosphors including nanophosphors, such as spray pyrolysis, sol-gel, hydrothermal synthesis, chemical vapor synthesis, and solvothermal synthesis in addition to conventional milling processes where the particle size is in micron range. See for example: D. Dosev, Bing Guo and I. M. Kennedy, "Photoluminescence of $Eu^{3+}:Y_2O_3$ as an indication of crystal structure and particle size in nanoparticles synthesized by flame spray pyrolysis", Aerosol Science Vol. 37, 402, 2006; D. Jia, "Nanophosphors for White Light LEDs", Chem. Eng. Comm. Vol. 194, 1666, 2007; H. Zhu, E. Zhu, H. Yang, L. Wang, D. Jin and K. Yao, "High-Brightness $LaPO_4$: $Ce^{3+}$, $Tb^{3+}$ Nanophosphor: Reductive Hydrothermal Synthesis and Photoluminescent Properties", J. Am. Ceram. Soc. Vol. 91, 1682, 2008; A. Konrad, T. Fries, A. Gahn, F. Kummer, U. Herr, R. Tidecks and K. Samwer, "Chemical vapor synthesis and luminescence properties of nanocrystalline cubic $Y_2O_3$; Eu", J. Appl. Phys. Vol. 86, 3129, 1999; X. Li, H. Liu, J. Wang, H. Cui, S. Yang and I. R. Boughton, "Solvothermal synthesis and luminescent properties of YAG: Tb nano-sized phosphor", Journal of Physics and Chemistry of Solids. Vol. 66, 201, 2005; and JP3690968. However, the above methods are limited by the material that can be used either due to solubility and/or hardness limitations. Also, the non-mechanical methods do not generate fine phosphors directly and require additional treatment steps to generate the fine phosphors.

SUMMARY OF THE INVENTION

In one aspect the present invention is related to making functional multi-element ceramics, especially, targeted toward producing phosphorous fine particles having complex lattice structures and comprising at least three elements.

In one aspect the present invention creates a novel approach to producing functional fine particles, particularly phosphor fine particles, dispersed in a solution. Creating phosphor fine particles using the method of the present invention has many advantages. Producing phosphor fine particles as a result of laser fragmentation of a bulk material allows for direct generation of fine particles. In one embodiment the invention is a method of making a solution of phosphor fine particles comprising the steps of: providing a bulk phosphor material in a liquid and irradiating the bulk phosphor material with an ultrashort-pulsed-laser-fragmentation beam having a pulse duration of 500 picoseconds or less thereby forming phosphor fine particles having a diameter of from 1 to 5000 nanometers wherein the fine particles retain the chemical composition and crystalline structure of the bulk phosphor material. Unlike wet processes, this solution does not require any chemical treatment. The method of this invention is not limited by the hardness or solubility of the bulk material.

The formed phosphor fine particles can be isolated from the liquid or kept in the liquid as a colloid. The colloid solutions are stable for at least one week at room temperature, 25° C., even in the absence of stabilizing compounds. The starting bulk phosphor material can be a crystal doped with at least one rare-earth element including but not limited to Eu, Tb, Ce, Sm, Dy and Y. The liquid can be a variety of liquids including water, preferably deionized and with a resistance of 0.05M Ohm·cm or greater. The liquid can also be an alcohol, an aldehyde, an organic acid, a ketone, an aromatic group containing liquid or a volatile organic compound.

While the invention is specifically described with respect to fine phosphorous particles, it is also applicable to producing fine particles from other functional compounds having complex crystalline structures and comprising three or more elements.

DETAILED DESCRIPTION OF A PREFERRED EMBODIMENT

Figure 1:
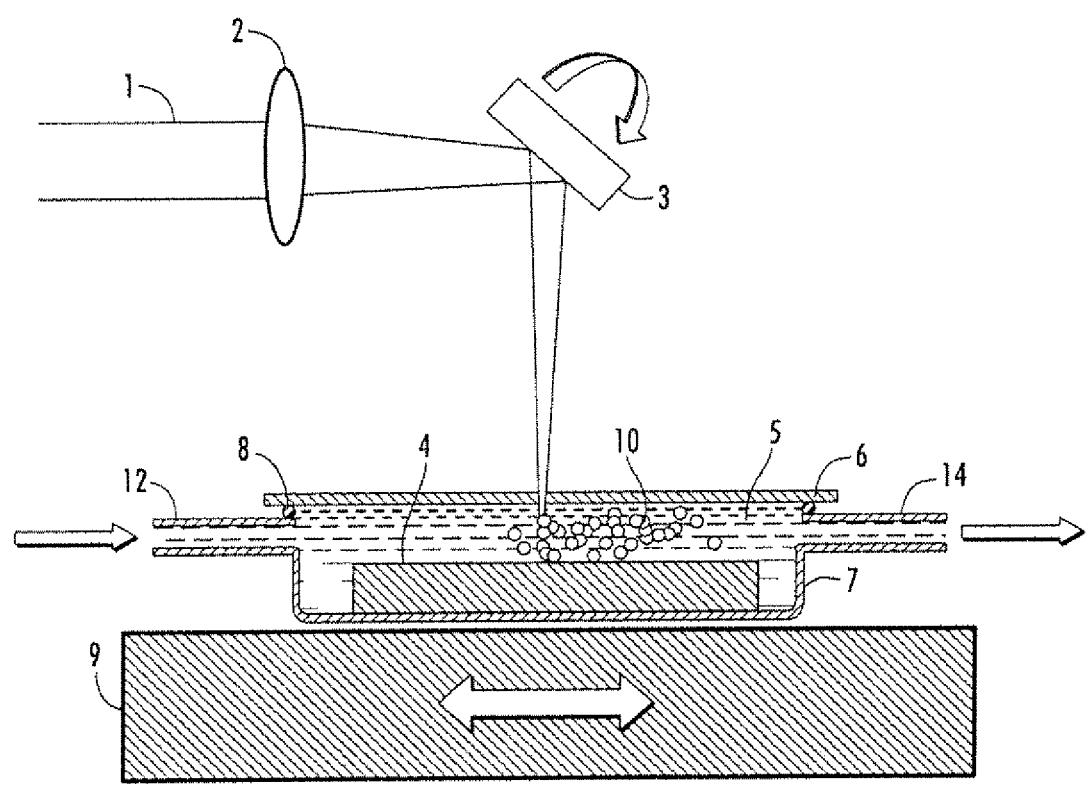
FIG. 1 is a schematic illustration of an ultrafast pulsed laser system for producing phosphor fine particles in a liquid according to the present invention.

A variety of industrial and research fields require a novel method for generating fine particles of a functional ceramic which has the same functionality and crystal structure as the bulk material it is derived from. These include phosphorous ceramics, light-absorbing ceramics including sunlight absorbers in solar cells, and ceramic ionic conductors which can be used in fuel cells, most of which have complex lattice structures comprising three or more elements.

In the present specification and claims the terms "ceramic" or "ceramics" mean an inorganic, non-metallic solid compound regardless of whether the lattice structure it has is a single crystal, a multi-crystal, a glass or amorphous.

Phosphorous ceramics, hereafter simply called a phosphor, are among those functional ceramics that could unveil its huge potential applications if a method of generating their fine particles is established.

Currently, phosphors are being used in a wide application sphere including in emission devices, plasma display panels, cathode ray tubes (CRTs), light emission diodes (LEDs), vacuum florescent displays (VFDs), electro luminescence displays (ELDs), RGB screens, radiographic imaging, nuclear spectroscopy, crystal scintillators, and biotags.

Phosphors based on optical transitions under excitation of rare-earth elements such as Eu, Tb, Ce, Sm, Dy and Y are especially promising materials because they have a strong emission intensity and a long lifetime of luminescence. For example, luminescence of Ce-doped YAG originated from electronic orbital transition from 5 d to 4 f shows a strong broad spectrum centered around 530 nm wavelength, which makes up for the spectrum lacking in white LED excited by blue LED. See for example: S. Nishiura, S. Tanabe, K. Fujioka, Y. Fujimoto and M. Nakatsuka, "Preparation and Optical Properties of Transparent Ce:YAG Ceramics for High Power White LED", 2009 IOP Conf. Series: Materials Science and Engineering Vol. 1, 012031, 2009 and K. Bando, K. Sakano, Y. Noguchi and Y. Shimizu, "Development of High-bright and Pure-White LED Lamps", Journal of Light & Visual Environment Vol. 22, 2, 1998. However, some of these phosphor materials contain a hard, chemically stable and insoluble host material like a garnet, spinel, silicon oxide, silicon nitride, oxynitride, aluminum oxide, SiAlON, or crystals and/or ceramics that can be used as laser gain medium, which limits fields of applications because of their restricted physical form. See for example:: S. Nishiura, S. Tanabe, K. Fujioka, Y. Fujimoto and M. Nakatsuka, "Preparation and Optical Properties of Transparent Ce:YAG Ceramics for High Power White LED", 2009 IOP Conf. Series: Materials Science and Engineering Vol. 1, 012031, 2009; K. Bando, K. Sakano, Y. Noguchi and Y. Shimizu, "Development of High-bright and Pure-White LED Lamps", Journal of Light & Visual Environment Vol. 22, 2, 1998; JP 4193471; WO/2004/101711; WO/2006/011317; and WO/2006/006582.

The present invention discloses a method for obtaining a solution with phosphor fine particles or the fine particles themselves extracted from the solution which will help to bring out their potential uses which have been restricted in the past by their physical constraint in these host materials. In the present specification and claims for ease of use the term solution is used to denote fine particles in a liquid whether or not they are physically dissolved in the liquid. The particles may be in the form of a suspension, a colloidal suspension, or may in fact be dissolved in the liquid.

In an ultra-short pulsed laser system the electromagnetic field energy or fluence of the pulse is concentrated in an extremely short pulse duration ranging, for example, from a few femtoseconds to several tens of picoseconds. These systems show many interesting phenomena in their interaction with materials which differentiates an ablation mechanism based on it from one based on a longer pulsed or a continuous wave laser, see U.S. Pat. No. 5,656,186. One of the good examples of the unique character can be seen in the femtosecond-pulsed laser deposition (fs-PLD) technique, where the incidence of fs-pulsed laser onto the source material causes a breakdown in the material surface, generating nano-particles which fly out and can be deposited onto a substrate to grow a film, as is disclosed in U.S. patent application publication No. 2008/0006524. The inventors also discovered that the low pulse energy near the ablation threshold is preferred for the generation of ceramic fine particles using ultrashort pulsed laser fragmentation.

Conventional laser ablation methods using pulses of a nanosecond or longer or using a continuous wave laser are based on a heating process which often changes the composition or structure of the bulk starting material. The current process is based on an ultrashort pulsed laser ablation whose fluence of the pulse is properly controlled to induce the breakdown on the surface of the source bulk material to generate fine particles having the same basic property as the source material, we term this process as ultrashort-pulsed-laser fragmentation (UPLF). The invention is characterized by generation of fine phosphor particles from a bulk phosphor material set in a liquid by UPLF with the fine phosphor particles maintaining or preferably improving the basic fluorescent properties of the bulk material. Direct generation of phosphor fine particles from a bulk material according to the present invention can reduce production cost associated with a large amount of intermediate treatments, see U.S. patent application publication No. 2009/0142245, and that of waste liquid treatments which chemical methods often face. Also, the by-product-free clean process of the present invention is ecologically beneficial. Moreover, the present invention is applicable to generation of phosphors from a variety of materials, including but not limited to garnet, spinel, silicon oxide, silicon nitride, oxynitride, aluminum oxide, SiAlON and laser gain crystals and/or ceramics which are mechanically hard. In addition to the fragmentation of the above phosphor materials, this invention can also be used to prepare fine sized precursor materials to achieve a good homogeneity in the phosphor bulk material synthesized from the precursor materials.

A prior patent publication JP200957568A has disclosed a method of generation of phosphor ZnO nanoparticles in water using pulsed laser, wherein metallic zinc is used as a precursor and it is ablated by a laser with extremely high pulse energy of 50 millijoules or higher. However, this method is based on the specific material combination between water and zinc, and doesn't have applicability to other materials. A crucial difference between the present invention and the prior method is that the present invention preserves the basic luminescent property of the original material by conditioning the laser pulse while the previous method actively alters the source material, zinc metal, itself by an oxidation reaction between water and zinc.

FIG. 1 schematically illustrates a portion of a laser based system for producing phosphor fine particles in a liquid according to the present invention. In one embodiment a laser beam 1 is received from an ultrashort pulsed laser source, not shown, focused by a lens 2, and guided by a guide mechanism 3, which could be before lens 2, onto a target 4. In one embodiment, the target 4 is a compressed pellet of a bulk phosphor powder. The target 4 is submerged several millimeters and preferably less than 1 cm, below the surface of a liquid 5 in a container 7 that is topped by a glass window 6. An O-ring type of seal 8 is placed between the glass window 6 and the container 7 to prevent the liquid 5 from leaking out. The container 7 is placed on a motion stage 9 that can produce translational motion. The container 7 has an inlet 12 and an outlet 14 and liquid 5 is flowed through the container 7 so that the generated fine phosphor particles 10 can be carried away and collected elsewhere. The flow of liquid 5 also cools the laser focal volume. The flow of liquid 5 should be fast enough to fill the gap between the target 4 and the glass window 6 and to avoid having any gas bubbles generated during laser ablation from staying on the glass window 6. The liquid 5 is preferably, but not limited to, de-ionized water having resistivity preferably of 0.05 MOhm·cm or greater, more preferably of 1 MOhm·cm or greater. The liquid 5 may also be an organic liquid including but not limited to alcohol, ketone, organic acid, aldehyde, aromatic group containing liquids and other volatile organic compounds.

The target 4 can be a bulk phosphor, a powdered phosphor pressed or sintered into a target, or a phosphor-coated material. A binder can also be used to help solidify the powdered phosphor. Such a binder includes, but is not limited to, a polymer, a cellulose, a sugar, an agar, or a gelatin. If the temperature of the liquid 5 is low enough for both a solid phase and a liquid phase of the liquid 5 to coexist, solid frozen liquid 5 can be used as a binder. The phosphor material is either an organic material or an inorganic material, or it can be a combination of both. The inorganic material might be a mixture of oxides, nitrides, nitrogen oxides or oxynitride, including but not limited to a garnet, spinel, silica, or SiAlON in which rare-earth elements selected from the group of Sc, Y, La, Ce, Pr, Nd, Pm, Sm, Eu, Gd, Tb, Dy, Ho, Er, Tm, Yb and Lu might be contained. The target can also be a crystal, a ceramic and/or a glass that can be used as laser gain medium such as, for example, Nd-doped yttrium aluminum garnet, Ti-doped aluminum oxide, Er-doped silica, Yb-doped $CaF_2$ and so on. The phosphor can also be a mixture of nanomaterials of various particle sizes, comprising a semiconductor or insulator including but not limited to zinc sulfide (ZnS), zinc selenide (ZnSe), zinc telluride (ZnTe), cadmium sulfide (CdS), cadmium selenide (CdSe), cadmium telluride (CdTe), lead selenide (PbSe), gallium nitride (GaN), aluminum nitride (AlN), aluminum gallium nitride (AlGaN), aluminum indium gallium nitride (AlInGaN), gallium phosphide (GaP), gallium arsenic phosphide (GaAsP), gallium arsenide (GaAs), aluminum arsenide (AlAs), aluminum gallium arsenide (AlGaAs), aluminum gallium indium phosphide (AlGaInP), indium gallium phosphide (InGaP), indium aluminum phosphide (InAlP), silicon (Si), germanium (Ge), silicon carbide (SiC), or carbon (C). Also, the phosphor can be a fluorescent material which can be used in a light emitting device as is listed below, but not limited to: $Ca_{10}(PO_4)_6FCl$: Sb,Mn; $M_5(PO_4)_3Cl$:Eu, wherein M is at least one material selected from the group of Sr, Ca, Ba and Mg; $BaMg_2Al_{16}O_{27}$: Eu; $BaMg_2Al_{16}O_{27}$: Eu, Mn; 3.5MgO 0.5 $MgF_2$ GeO: Mn; $Y_2O_2S$: Eu; $Mg_6As_2O_{11}$: Mn; $Sr_4Al_{14}O_{25}$: Eu; (Zn,Cd)S: Cu; $SrA_{12}O_4$: Eu; $Ca_{10}(PO_4)_6ClBr$: Mn, Eu; $Zn_2GeO_4$: Mn; $Gd_2O_2S$: Eu; $La_2O_2S$: Eu; $Sr_2SiO_4$: Eu; $Y_2Al_5O_{12}$: Ce; $Y_2Al_5O_{12}$: Tb; $SrGa_2S_4$: Eu; SrS: Eu; $BaMgAl_{10}O_{17}$: Eu; $BaMgAl_{10}O_{17}$: Eu, Mn; $Y_2O_3$: Eu; $SrAl_2O_4$: Eu, Dy; $LaPO_4$: Ce, Tb.

The laser beam 1 may have a wavelength of about 1030 nanometers, a layer of water of a few millimeters has negligible absorption at this wavelength. The beam 1 preferably has a pulse energy of from 1 nanoJoule to 10 milliJoule, more preferably from 1 to 20 microJoules, and most preferably from 1 to 10 microJoules. Preferably the beam 1 has a pulse duration of 500 picoseconds or less, preferably from 1 femtoseconds to 500 picoseconds, and more preferably from 10 femtoseconds to 20 picoseconds. Shorter pulse durations reduce unwanted thermal effects, but when the pulse duration approaches several tens of femtoseconds or when the liquid layer has a non-negligible thickness, the temporal broadening of the pulse due to the wavelength dispersion of the refractive index in the liquid becomes more obvious. In that case, at least an optical component for the dispersion compensation will need to be inserted in the optical path. The optical components for this include, but are not limited to, a pair of optical diffractive grating and a volume bragg grating. Also insertion of a material having the counter dispersion or optical waveguide including, but not limited to, an optical fiber, a photonic crystal fiber, a photonic band gap fiber, a non-linear optical fiber, and fiber bragg grating can compensate the effect of pulse duration broadening. Preferably the beam 1 has a pulse repetition rate of 10 kHz to 100 GHz, more preferably from 100 kHz to 100 MHz, and most preferably from 100 kHz to 5 MHz. A preferred laser system will be further discussed below. Liquid flow, beam movement, or both may be used to avoid heat accumulation at these high repetition rates. Preferably the liquid 5 flows at a rate of 1 milliliter per second or greater and more preferably at a rate of 10 milliliters per second or greater.

By way of example, the guide mechanism 3 can be a vibration mirror 3 configured for fast scanning or other movement of the laser beam 1 on the surface of the target 4. The mirror 3 vibration frequency is preferably 10 Hz or greater with an angular amplitude of 1 mrad or greater, such that a scanning speed on the surface is 0.01 meters per second or greater. Such a mirror can be a piezo-driven mirror, a galvanometer mirror, or other suitable apparatus for beam movement. Two or more mirrors can be used to achieve a two-dimensional movement in the image plane of the objective lens. Ideally, the image plane and the target surface are entirely in parallel, and more preferably the incident angle of the laser beam pulse on the target is a constant angle independent of the position of the spot in the image plane. Another lens can be also implemented to adjust the position of the focusing point along the optical path.

As discussed above flow of the liquid 5 is introduced to the container 7 by a circulation system, with a flow speed of 1 milliliter per second or greater. Placing a glass window 6 above the target 4 and filling the gap between the target 4 and the window 6 with flowing liquid 5 is very important for fine particles generation. Liquid flow is necessary to uniformly distribute the generated fine particles 10 in the liquid 5. However, if there is no glass window 6 on top of the container 7 the upper surface of the flowing liquid 5 will fluctuate during flow and it will cause a fluctuation in the thickness of liquid 5 above the target 4. This can change the optical path properties of the laser beam 1 and cause the broader distribution of fine particles size. Therefore, this invention introduces an optical window 6 above the flowing liquid 5 to keep a constant depth of liquid 5 above the target 4. When a circulation system is not available, introducing lateral vibration movement, for example perpendicular to the laser beam 1 as indicated in FIG. 1, to the motion stage 9 can also cause liquid 5 flow locally across the ablation spot. The motion stage 9 preferably has a vibration frequency of several Hz and an amplitude of several millimeters. A shaker can also be used to generate liquid circulation, where the circular movement of the shaker can cause circular movement of the liquid too. The glass window 6 is not necessary in the above two situations; however, the use of the motion stage 9 or a shaker will introduce non-uniformity in the thickness of the liquid layer above the target 4 and will cause a broader size distribution of the generated fine particles 10.

The embodiment in FIG. 1 shows the target 4 as completely submerged in liquid 5, which is not a necessary condition for the present invention. As long as a portion of the target 4 is in contact with liquid 5, the laser fragmentation can take place at the target-liquid interface.

In various embodiments of the present invention, stable and chemically pure colloids are produced by controlling both the laser parameters and the liquid flow. These colloids are stable at room temperature, 25° C., for at least one week will no added stabilizing agents. However, the present invention does not require that the liquid 5 be free from stabilizing agents. A stabilizing agent can be useful in obtaining a well-dispersed solution. Laser parameters of importance include pulse duration, pulse energy, pulse repetition rate, and laser beam movement rate. Ultrashort pulse widths are preferred. It is well-known in many laser processing applications that an ultrashort pulse duration, for example in the range of a few picoseconds to several hundreds of femtoseconds, enhances ablation efficiency due to a very high peak power and a small heat-affected zone. For applications in metal and metal oxide fine particles nanoparticle generation, in particular, previous studies have found that low pulse energy, more precisely a low fluence, near the ablation threshold is preferred for fine particles generation. See for example, B. Liu, Z. D. Hu, Y. Che, Y. B. Chen, X. Q. Pan, "Nanoparticle generation in ultrafast pulsed laser ablation of nickel", Applied Physics Letters, Vol. 90, 044103 (2007) and B. Liu, Z. D. Hu, Y. Che, "Ultrafast sources: ultrafast lasers produce nanoparticles", Laser Focus World, Vol. 43, 74 (2007). The ablated material exists predominantly in the form of fine particles with a narrow size distribution. A U.S. patent application publication No. 2008/0006524 also teaches a method of generating nanoparticles in a vacuum and in ambient gas based on these studies. The current inventors believe that the low pulse energy near the ablation threshold is also preferred for phosphor fine particles generation. Preferably a high pulse repetition rate, for example at least about 100 kHz is employed in the present invention for at least three reasons. The first is the multiple pulse effect. With a short pulse separation of less than 10 micro-seconds achieved with a high repetition rate greater than 100 kHz, the ablated material, before drifting away from the laser focal volume, will receive multiple laser beam pulses and become highly charged. The current inventors have discovered stable fine particles colloids can be made at such high repetition rates without adding additional stabilizing chemical agents. The second reason is that upon ablation by multiple pulses, fragmentation of large particles can happen, resulting in a size distribution dominated by fine particles. The third reason is a high production rate that benefits from such a high repetition rate. The current inventors have also discovered that fast scanning of the laser beam during ablation is beneficial with high repetition rate operation. For example, without such fast scanning of the laser beam, the stream of fine particles produced by the leading laser pulses will eventually block the subsequent laser pulses by scattering and absorption. More importantly, accumulated heating of the liquid due to the high repetition rate can not only generate bubbles which decrease the production efficiency but also induce fine particles coagulation. In addition to the laser parameters, the current inventors found that movement of the liquid is also useful in making stable fine particles. This is primarily because a dispersed suspension of fine particles in a liquid such as water is essentially in a metastable state, i.e., a kinetically stable state instead of a thermodynamically stable state. The flow of the liquid during production helps to reduce fine particles thermal movement that may overcome the kinetic barrier of coagulation. Moreover, fast scanning of the laser beam is also beneficial for reducing the particle thermal motion.

The assignee of the present application has disclosed several fiber-based systems of chirped pulse amplification, which have a high repetition rate of from 100 kHz to above 1 MHz, an ultrashort pulse duration from 500 femtoseconds to a few picoseconds, and a high average power of more than 10 W. By way of example, a fiber-based chirped pulse amplification system (FCPA) may be used in various embodiments of the present invention. The commercially available D-1000 available from IMRA America provides microjoule pulses and an adjustable repetition rate over the range of 100 KHz to 5 MHz, with 1 W average power. Output pulse widths are below 1 picoseconds. These lasers are particularly suited for the current application. Compared with the typical 1 to 10 kHz repetition rate of standard solid state lasers, these fiber-based systems can improve the production rate by one order of magnitude. With a typical average power of 10 W and with split beams, the production speed can be increased by a factor of 5. To split a beam from the laser, a half-transparent mirror or a polarizing or non-polarizing beam splitter can be used. Also, the combination of a polarizing beam splitter and an electro-optical modulator, which modulates the polarization of the beam in a certain temporal window is a method of picking up pulses from a temporal pulse sequence. The assignee also has developed a laser technology to generate temporally grouped pulses comprising at least two pulses having a temporal separation of shorter than one-third of the inverse of the repetition frequency, called "Burst-mode femtosecond pulsed laser" which is beneficial to control the size of the generated phosphor fine particles. See M. Murakami, B. Liu, Z. Hu, Z. Liu, Y. Uehara and Y. Che, "Burst-Mode Femtosecond Pulsed Laser Deposition for Control of Thin Film Morphology and Material Ablation", Applied Physics Express, Vol. 2, 042501 (2009).

Figure 2:
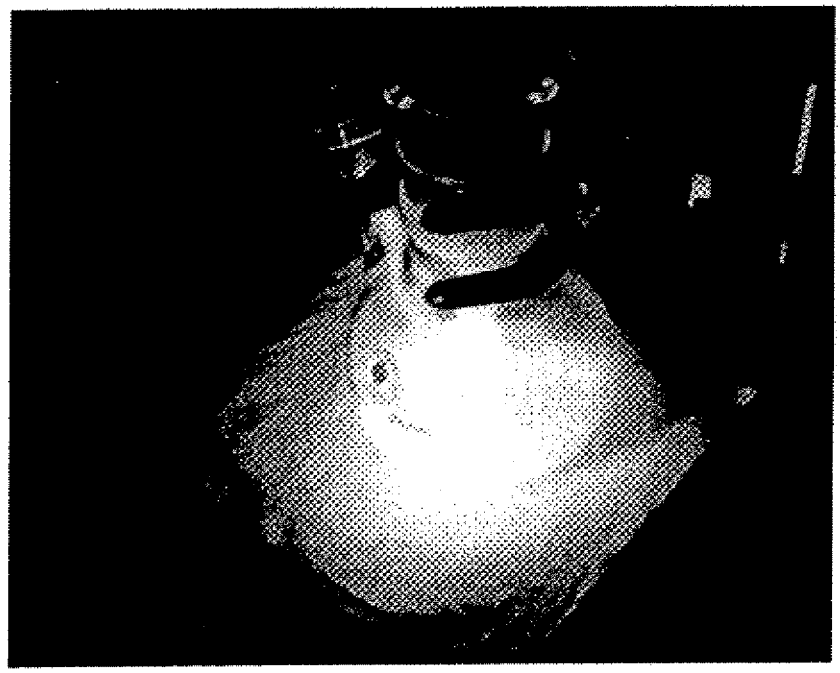
FIG. 2 shows a picture of UV-excited fluorescence of a collected suspension of phosphor fine particles made according to the current invention after excitation at 365 nanometers.

FIG. 2 is a picture of a fluorescing solution made from phosphor fine particles generated and collected according to the present invention. The bulk phosphor material subjected to UPLF according to the present invention was a pellet of an oxynitride compound phosphor powder, "Red Phosphor ZYP_630 powder" from Beijing Nakamura Yugi Science & Technology Corporation. The phosphor powder was compressed into a pellet sitting in a copper cup using a mold and hydraulic pressing. It was subjected to UPLF under the following conditions: 10 microJoule laser pulse with a 700 femtosecond pulse duration from a Yb-doped fiber laser having a 1030 nanometer center of wavelength operating at a 200 kHz repetition rate. The laser beam was focused on the surface of the pellet of pressed "Red Phosphor ZYP_630 powder" by an f=170 millimeter objective lens. The spot size was about 50 micrometers. About 80 milliliters of water was circulated through the container by a peristaltic pump with a flow rate of about 240 milliliters per minute providing a flow speed of about 10 centimeters per second across the target surface. A round flask, as shown in FIG. 2, was used as a reservoir as part of the circulating liquid system during the UPLF process. The collected particles in solution were then excited at wavelength of 365 nanometers, the solution showed a strong orange luminescence.

Figure 3:
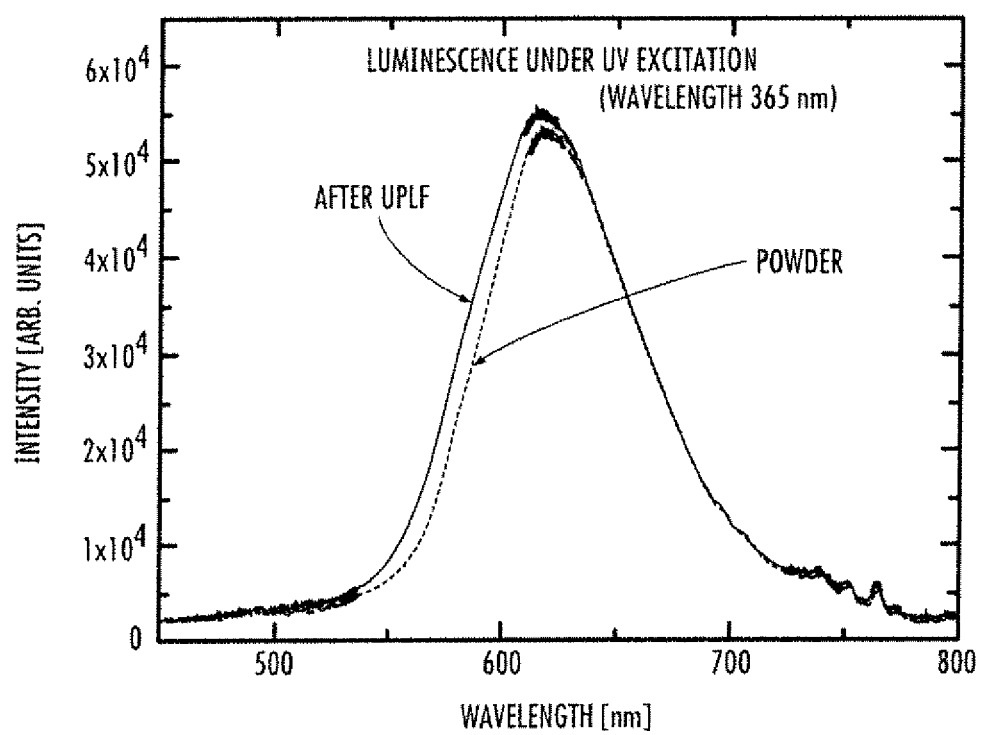
FIG. 3 shows the luminescence spectra of a bulk phosphor powder in water before ultrashort-pulsed-laser fragmentation (UPLF) according to the present invention and a suspension of phosphor fine particles after UPLF according to the present invention.

FIG. 3 shows the UV-excited luminescence spectra of the phosphor powder in water before UPLF treatment and the spectra of a solution with the phosphor fine particles after UPLF treatment as described above. The two luminescence spectra in FIG. 3 are nearly identical indicating that the basic fluorescent property of the original phosphor powder is maintained after UPLF. This also indicates that the UPLF process preserves the chemical composition and crystalline structure of the bulk material it is derived from.

Figure 4:
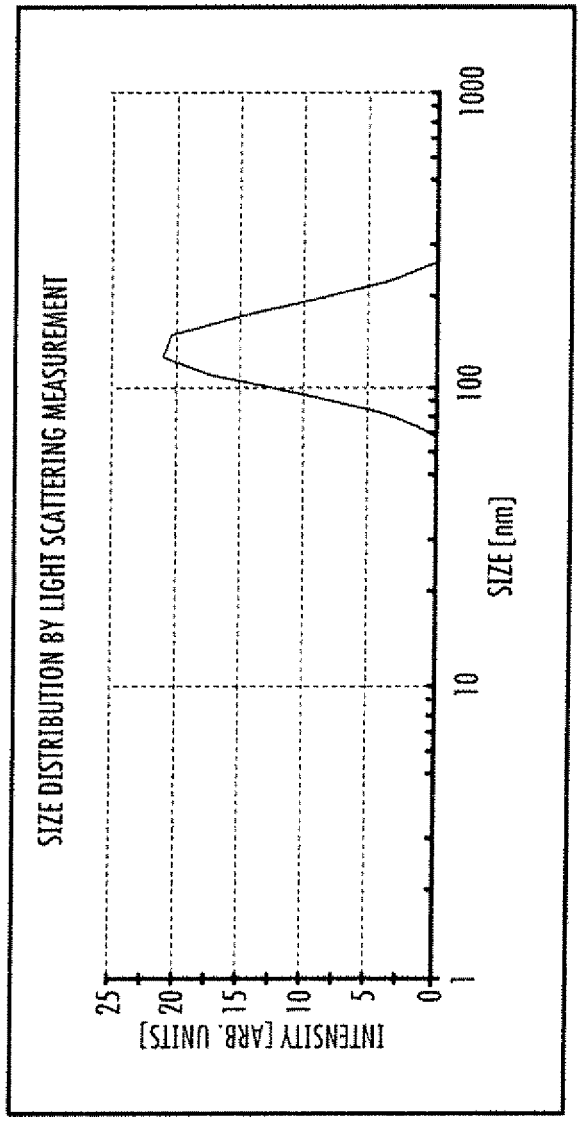
FIG. 4 is a dynamic light scattering measurement curve showing the size distribution of phosphor fine particles made by UPLF according to one embodiment of the present invention.

FIG. 4 shows a size distribution profile of the after UPLF specimen selectively taken from the solution of FIG. 3 after centrifugal separation by 4000 rpm for 10 minutes of the same solution in FIG. 3. The average size of the obtained fine particles was 140 nanometers with a distribution width of 35 nanometers, which is more than fifty times smaller than the original particle diameter of $8.0 \pm 0.5$ μm. Centrifugal separation produces spatial separation of generated phosphor fine particles into different sizes according to their masses. Larger particles in the sub-micron range are easy to sink without centrifugal separation, but they can also be used as phosphor fine particles. In the present invention it is preferable to generate fine particles having an average diameter of from 1 nanometers to 5000 nanometers, more preferably super fine particles having an average diameter of from 1 nanometers to 1000 nanometers.

Figure 5:
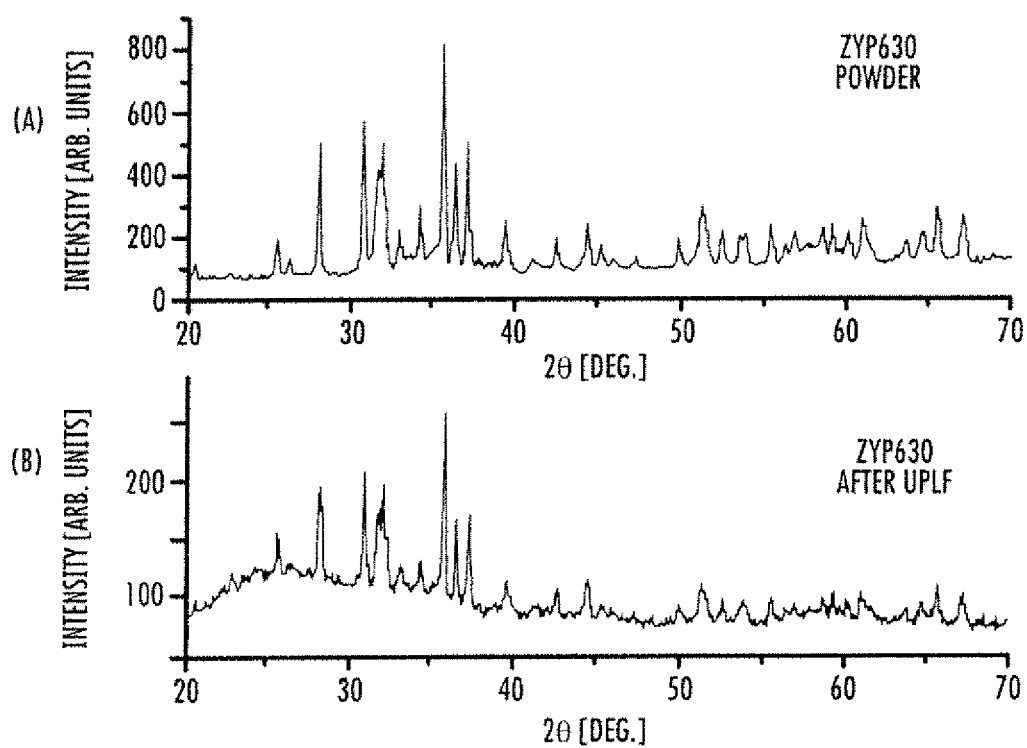
FIGS. 5(a) and 5(b) show the patterns of powder x-ray diffraction measurements of "Red Phosphor ZYP__630 powder" in bulk and that after UPLF according to the present invention, respectively.

FIGS. 5(a) and 5(b) show the results of powder x-ray diffraction measurement of the original "Red Phosphor ZYP_630 powder" and the particle extracted from the solution after UPLF, respectively. The positions of all Bragg peaks are perfectly matched between the two, which clearly shows that the crystal structure of the original phosphor is maintained after UPLF. Also the observed Bragg peaks have similar line widths to those of the raw material, which means the fine particles have minimal structural changes. Furthermore, the peaks of the UPLF produced material are overall sharper than the peaks seen when nano particles are produced using a nanosecond pulsed laser system see G. Ledoux, D. Amans, C. Dujardin and K. Masenelli-Varlot, "Facile and rapid synthesis of highly luminescent nanoparticles via pulsed laser ablation in liquid", Nanotechnology, Vol. 20, 445605 (2009). The line width for Bragg peaks of material produced using UPLF in accordance with the present invention is typically about 0.5 degree or less while the value reported for nanosecond pulsed laser methods is typically about 1.0 degree, meaning the nanoparticles made by the UPLF process have a higher crystalline quality. This is another demonstration of the value of the present process over those using nanosecond pulses.

Prepared solutions of fine particles or the precipitated fine particles generated according to the present invention can be used in light emitting diodes (LEDs), light bulbs, plasma display panels, cathode ray tubes (CRTs), vacuum florescent displays (VFDs), electro luminescence displays (ELDs), RGB screens and other light emission devices. Depending on the process of production, the dried fine particles or the fine particles dispersed in another liquid, gel, emulsion, adhesive agent or epoxy may be preferred. They can also be used in phosphor products including but not limited to phosphor coatings, phosphor printings, wavelength converters, radiographic imaging, nuclear spectroscopy, crystal scintillators, and biotags. The method of the current invention can be used not only to fragment a prepared phosphor material but also to prepare fine precursor materials to grow a high-quality homogeneous phosphor material.

In addition, the solutions of fine particles or the precipitated fine particles generated from chemically stable, non-toxic biocompatible bulk phosphor can be used as a luminescent agent in chemical, biological and medical sensing and imaging techniques where a chemically unstable or toxic material could not be used, such as in an in vivo experiment or detection methodology. Unlike a wet chemical synthesis, which is how most currently available fine particles are generated for these uses, various embodiments of the present invention provide many degrees of freedom to select a bulk material according to the functions required to be implemented by the fine particles.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A method of fabricating a solution of fine particles of a multi-element ceramic comprising the steps of:
   a) providing a bulk target material of a multi-element ceramic comprising at least three elements with at least a portion of the target material being in contact with at least a portion of a liquid; and
   b) irradiating the target material with an ultrashort-pulsed-laser-fragmentation beam having a pulse duration of 500 picoseconds or less and forming fine particles of the multi-element ceramic having an average diameter ranging from 1 to 5000 nanometers, wherein the fine particles retain the chemical composition and crystalline structure of the bulk target material.

2. The method of claim 1, wherein step a) comprises providing a bulk target material comprising a solidified target formed from micron to millimeter sized powder of the multi-element ceramic by at least one of pressing, sintering, or agglomerating with at least one binder material.

3. The method of claim 1, wherein step b) comprises forming fine particles having an average diameter of from 1 to 500 nanometers.

4. The method of claim 1, wherein step b) further comprises using an ultrashort-pulsed-laser-fragmentation beam having a pulse duration of from 10 femtosecond to 20 picoseconds.

5. The method of claim 1, wherein step b) further comprises using an ultrashort-pulsed-laser-fragmentation beam having a repetition rate of from 10 Hz to 1 GHz.

6. The method of claim 1, wherein step b) further comprises using an ultrashort-pulsed-laser-fragmentation beam having a repetition rate of from 1 kHz to 100 MHz.

7. The method of claim 1, wherein step b) further comprises using an ultrashort-pulsed-laser-fragmentation beam having a pulse energy of from 1 nanoJoules to 10 milliJoules.

8. The method of claim 1, wherein step b) further comprises using an ultrashort-pulsed-laser-fragmentation beam having a center of wavelength that is in the UV, visible, or near infrared region.

* * * * *

UNITED STATES PATENT AND TRADEMARK OFFICE
CERTIFICATE OF CORRECTION

PATENT NO.        : 8,540,173 B2
APPLICATION NO.   : 12/951557
DATED             : September 24, 2013
INVENTOR(S)       : Yuki Ichikawa et al.

It is certified that error appears in the above-identified patent and that said Letters Patent is hereby corrected as shown below:

On the Title Page, Item (75) Inventors: "Zhengong Hu" should be --Zhendong Hu--.

Signed and Sealed this
Twenty-second Day of April, 2014

Michelle K. Lee
*Deputy Director of the United States Patent and Trademark Office*